United States Patent
Mao et al.

(10) Patent No.: US 6,256,176 B1
(45) Date of Patent: Jul. 3, 2001

(54) HIGHLY SENSITIVE SPIN VALVE HEADS USING A SELF-ALIGNED DEMAG-FIELD BALANCE ELEMENT

(75) Inventors: Sining Mao, Savage; Nurul Amin, Burnsville; Edward S. Murdock, Edina, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/355,784

(22) PCT Filed: Jul. 27, 1999

(86) PCT No.: PCT/US99/17009

§ 371 Date: Jul. 27, 1999

§ 102(e) Date: Jul. 27, 1999

(87) PCT Pub. No.: WO00/62282

PCT Pub. Date: Oct. 19, 2000

Related U.S. Application Data
(60) Provisional application No. 60/129,150, filed on Apr. 14, 1999.

(51) Int. Cl.⁷ ........................................................ G11B 5/39
(52) U.S. Cl. ................................................ 360/324.1
(58) Field of Search ............................. 360/322, 324.1, 360/324

(56) References Cited

U.S. PATENT DOCUMENTS

| | | | | |
|---|---|---|---|---|
| 5,617,276 | * | 4/1997 | Takada et al. | 360/113 |
| 5,654,854 | * | 8/1997 | Mallary | 360/113 |
| 5,666,248 | * | 9/1997 | Gill | 360/113 |
| 5,731,937 | * | 3/1998 | Yuan | 360/113 |
| 6,064,552 | * | 5/2000 | Iwasaki et al. | 360/113 |

* cited by examiner

*Primary Examiner*—Brian E. Miller
(74) *Attorney, Agent, or Firm*—Kinney & Lange, P.A.

(57) ABSTRACT

A magnetic read head (30) for use in a magnetic data storage and retrieval system has a first current contact (40), a second current contact (42), a magnetoresistive read sensor (34), and a demagnetization field balance element (50). Positioned between the first and second current contacts (40, 42) are both the magnetoresistive read sensor (34) and the demagnetization field balance element (50). The demagnetization field balance element (50) is both electrically isolated from and magnetically coupled to the magnetoresistive read sensor (34).

20 Claims, 3 Drawing Sheets

●─ HK*   ■─ SENSITIVITY

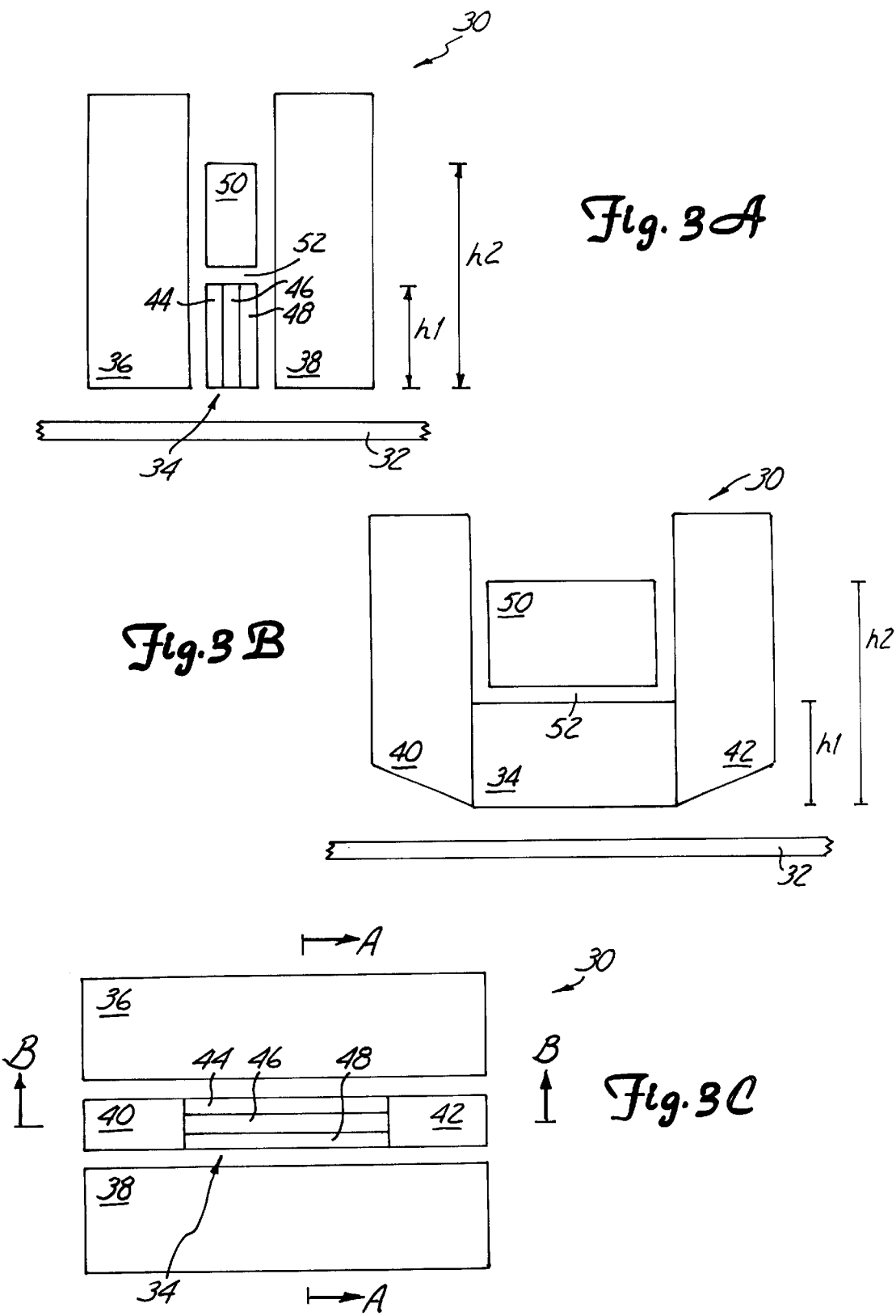

HIGHLY SENSITIVE SPIN VALVE HEADS USING A SELF-ALIGNED DEMAG-FIELD BALANCE ELEMENT

CROSS-REFERENCE TO RELATED APPLICATION

This application claims priority from Provisional Application No. 60/129,150 filed Apr. 14, 1999 for "Highly Sensitive Spin Valve Heads Using a Self-Aligned Demag-Field Balance Element" by Sining Mao, Nurul Amin and Edward S. Murdock.

BACKGROUND OF THE INVENTION

The present invention relates generally to the field of magnetic data storage and retrieval systems. In particular, the present invention relates a magnetic read head for use in a magnetic data storage and retrieval system and having a demagnetization field balance element for increasing a read sensitivity of a giant magnetoresistive spin valve read sensor.

Giant magnetoresistive (GMR) read sensors are used in magnetic storage systems to detect magnetically-encoded information stored on a magnetic medium or disc. A time-dependent magnetic field from a magnetic storage medium or disc directly modulates the resistivity of the GMR read sensor. The change in resistance of the GMR read sensor can be detected by passing a sense current through the GMR read sensor and measuring the voltage across the GMR read sensor. The resulting signal can be used to recover the encoded information from the magnetic storage medium or disc.

A typical GMR read sensor has a GMR spin valve that is a multi-layered device formed of a nonmagnetic spacer layer positioned between a ferromagnetic pinned layer and a ferromagnetic free layer. A magnetization of the pinned layer is fixed in a predetermined direction, typically normal to an air bearing surface of the GMR spin valve, while a magnetization of the free layer rotates freely in response to an external magnetic field. An antiferromagnetic material is typically exchange coupled to the pinned layer to fix the magnetization of the pinned layer in a predetermined direction.

Shields are generally placed on either side of the read sensor to ensure that the read sensor reads only that information which is stored directly beneath it on a magnetic medium or disc. Regular increases in areal densities of the magnetic media have made it necessary to regularly decrease the spacing between the shields positioned on either side of the read sensor. This decrease in the spacing between the shields has had the negative impact of decreasing the efficiency of the read sensor, thereby decreasing the read sensitivity of the read sensor, since the flux emanating from the magnetic media reaches a smaller portion of the read sensor.

This decrease in efficiency can be counteracted by decreasing the stripe height of the read sensor, that is, the length of the read sensor along its side perpendicular to the air bearing surface. However, decreasing the stripe height of the read sensor increases the demagnetization field acting upon the read sensor, thereby increasing the effective anisotropy of the read sensor, which in turn decreases the read sensitivity of the read sensor.

There is therefore a need to increase the read sensitivity of a read sensor of a magnetic read head by increasing the read sensor's efficiency without negatively impacting the effective anisotropy of the read sensor.

BRIEF SUMMARY OF THE INVENTION

The present invention is a magnetic read head having increased read sensitivity for use in a magnetic data storage and retrieval system. The magnetic read head has a first current contact, a second current contact, a magnetoresistive read sensor, and a demagnetization field balance element. Positioned between the first and second current contacts are both the magnetoresistive read sensor and the demagnetization field balance element. The demagnetization field balance element is both electrically isolated from and magnetically coupled to the magnetoresistive read sensor. The demagnetization field balance element is also electrically isolated from the first and the second current contacts.

In a first alternate embodiment of the present invention, the demagnetization field balance element is formed of a ferromagnetic material and is physically separated from the magnetoresistive read sensor, the first current contact, and the second current contact by a separation trench. In a second alternate embodiment of the present invention, the demagnetization field balance element is formed by photolithographically patterning a first photo mask over the magnetoresistive read sensor to define the magnetoresistive read sensor, oxidizing exposed edges of the magnetoresistive read sensor to form an insulation layer, depositing a layer of a soft magnetic material over the insulation layer, and lifting away the first photo mask to form the demagnetization field balance element.

BRIEF DESCRIPTION OF THE DRAWINGS

FIGS. 3A, 3B, and 3C are cross-sectional views of a magnetic read head in accord with the present invention.

DETAILED DESCRIPTION OF THE PREFERRED EMBODIMENTS

Figure 1A:
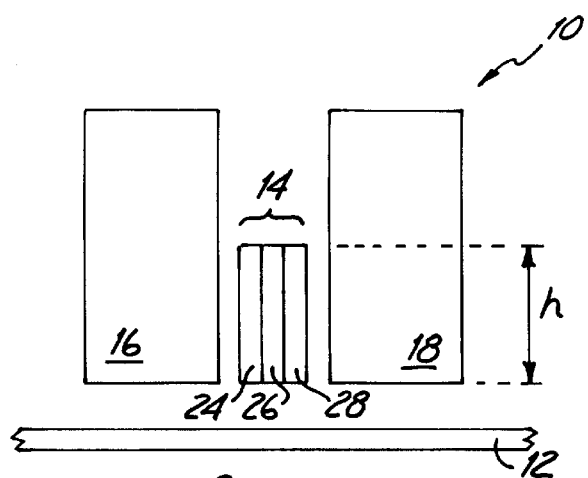
FIGS. 1A, 1B, and 1C are cross-sectional views of a magnetic read head of the prior art.
Figure 1B:
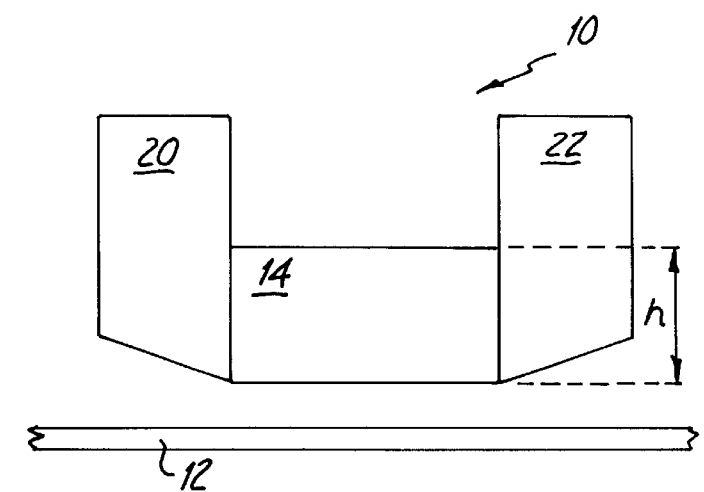
Figure 1C:
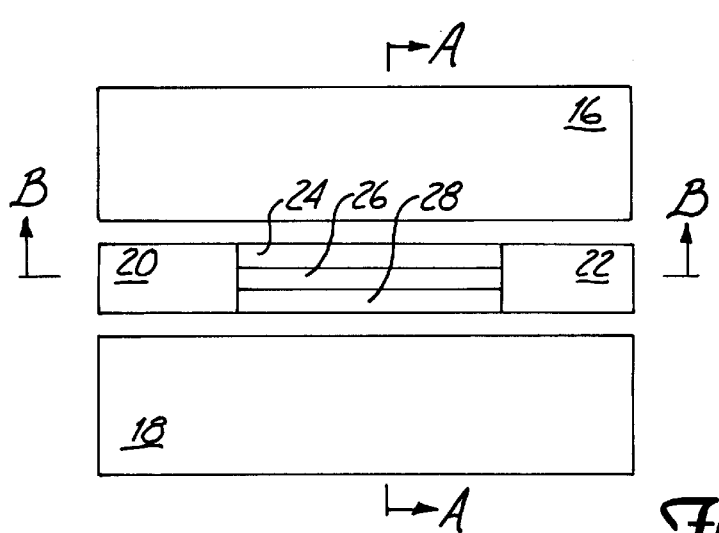

FIGS. 1A, 1B, and 1C are cross-sectional views of magnetic read head 10 of the prior art. FIG. 1C is a cross-sectional view of an air bearing surface of magnetic read head 10. FIG. 1A is a cross-sectional view of magnetic read head 10 taken along line A—A of FIG. 1C and magnetic disc 12. FIG. 1B is cross-sectional view of magnetic read head 10 taken along line B—B of FIG. 1C and magnetic disc 12. In FIGS. 1A, 1B, and 1C, all spacing and insulating layers are omitted for clarity. For ease of explanation and viewing, magnetic read head 10 and its components are not drawn to scale.

Magnetic read head 10 includes giant magnetoresistive (GMR) spin valve 14, first shield 16, second shield 18, first current contact 20, and second current contact 22. GMR spin valve 14 is positioned between first and second shields 16 and 18. GMR spin valve is further positioned between, and adjacent to, first and second current contacts 20 and 22.

GMR spin valve 14 is used to detect magnetically-encoded information stored on magnetic disc 12. A time-dependent magnetic field from magnetic disc 12 directly modulates the resistivity of GMR spin valve 14. The change in resistance of GMR spin valve 14 can be detected by passing a sense current through GMR spin valve 14 and measuring the voltage across GMR spin valve 14. The resulting signal can be used to recover the encoded information from magnetic disc 12. GMR spin valve 14 is a multi-layered device having free layer 24, spacer 26 and pinned layer 28. Spacer layer 26 is positioned between free layer 24 and pinned layer 28. A magnetization of pinned layer 28 is fixed in a predetermined direction, typically normal to the air bearing surface of GMR spin valve 14, while a magnetization of free layer 24 rotates freely in response to magnetic flux emanating from magnetic disc 12. The resistance of GMR spin valve 14 varies as a function of an angle formed between the magnetization direction of free layer 24 and the magnetization direction of pinned layer 28. Spacer layer 26 is preferably formed of a nonmagnetic material, whereas free layer 24 and pinned layer 28 are each preferably formed of ferromagnetic materials. GMR spin valve 14 may include additional layers, for instance an antiferromagnetic layer, a permanent magnet layer, or a soft adjacent layer.

Resistance changes of GMR spin valve 14 can be detected by providing a constant sense current through GMR spin valve 14 and monitoring the voltage across GMR spin valve 14, resistance changes of GMR spin valve 14 can be detected. First and second current contacts 20 and 22, though connection to a source of voltage (not shown in FIGS. 1A–1C), provide this sense current through GMR spin valve 14. First and second current contacts 20 and 22 are each preferably formed of a metallic material, such as gold or tantalum.

GMR spin valve 14 is sandwiched between first and second shields 16 and 18 to ensure that GMR spin valve 14 reads only that information which is stored directly beneath it on magnetic disc 12. To enable first and second shields 16 and 18 to absorb stray magnetic fields, first and second shields 16 and 18 are each preferably formed of a material having a relatively high permeability, such a sendust.

Regular increases in areal densities of the magnetic media have made it necessary to regularly decrease the spacing between first and second shields 16 and 18. This decrease in the spacing between first and second shields 16 and 18 has had the negative impact of decreasing the decay length of magnetic flux emanating from magnetic disc 12, that is, the length along GMR spin valve 14 that magnetic flux reaches. The decreasing decay length of magnetic flux results in decreased efficiency of GMR spin valve 14 since portions of GMR spin valve 14 receive sense current being but no flux, thereby reducing the overall output of GMR spin valve 14. One means of counteracting the decreasing efficiency of GMR spin valve 14 is to decrease stripe height h of GMR spin valve 14. The magnetic flux will be able to affect a greater percentage of a GMR spin valve with a shorter stripe height h, thereby having a greater efficiency. However, this solution is not generally desired since a shorter stripe height leads to decreased read sensitivity of GMR spin valve 14.

Figure 2:
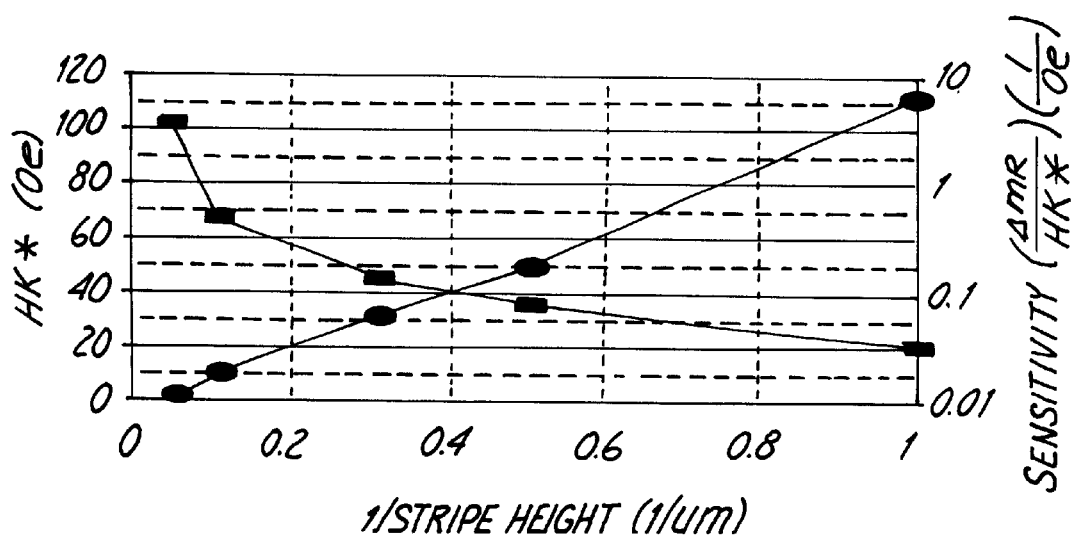
FIG. 2 is a graph comparing both effective anisotropy field on and read sensitivity of a read sensor in a magnetic read head to a stripe height of the read sensor.

FIG. 2 is a graph comparing both effective anisotropy field Hk* on and read sensitivity of a read sensor in a magnetic read head to stripe height h of the read sensor. The effective anisotropy Hk* of free layer 24 of GMR spin valve 14, which is shown on FIG. 2 with oval bullets, is the magnetic field required to rotate a magnetization of free layer 24 from its easy axis to its hard axis. The effective anisotropy Hk* of free layer 24 is roughly proportional to the magnetic moment Mrt of free layer 24 divided by the stripe height h of GMR spin valve 14.

The read sensitivity of GMR spin valve 14, which is shown on FIG. 2 with square bullets, is roughly proportional to the change in magnetoresistance (ΔR) of GMR spin valve 14 divided by the effective anisotropy field Hk* of free layer 24 of GMR spin valve 14. Accordingly the effective anisotropy Hk* of free layer 24 is inversely related to the read sensitivity of the GMR spin valve 14. As shown in FIG. 2, the greater the stripe height of GMR spin valve 14, the greater the read sensitivity of GMR spin valve 14 and the less the effective anisotropy field Hk* of free layer 24.

The present invention seeks to increase the read sensitivity of GMR spin valve 14 by increasing the stripe height h of GMR spin valve 14 without diminishing the efficiency of GMR spin valve 14.

FIGS. 3A, 3B, and 3C are cross-sectional views of magnetic read head 30 in accord with the present invention. FIG. 3C is a cross-sectional view of an air bearing surface of magnetic read head 30. FIG. 3A is a cross-sectional view of magnetic read head 30 taken along line A—A of FIG. 3C and magnetic disc 32. FIG. 3B is cross-sectional view of magnetic read head 30 taken along line B—B of FIG. 3C and magnetic disc 32. In FIGS. 3A, 3B, and 3C, all spacing and insulating layers are omitted for clarity. For ease of explanation, magnetic read head 30 and its components are not drawn to scale.

Magnetic read head 30 includes giant magnetoresistive (GMR) spin valve 34, first shield 36, second shield 38, first current contact 40, second current contact 42, and demagnetization field balance element 50. GMR spin valve 34 is positioned between first and second shields 36 and 38. GMR spin valve 34 is further positioned between, and adjacent to, first and second current contacts 40 and 42.

GMR spin valve 34 is used to detect magnetically-encoded information stored on magnetic disc 32. A time-dependent magnetic field from magnetic disc 32 directly modulates the resistivity of GMR spin valve 34. The change in resistance of GMR spin valve 34 can be detected by passing a sense current through GMR spin valve 34 and measuring the voltage across GMR spin valve 34. The resulting signal can be used to recover the encoded information from magnetic disc 32. GMR spin valve 34 is a multi-layered device having free layer 44, spacer 46 and pinned layer 48. Spacer layer 46 is positioned between free layer 44 and pinned layer 48. A magnetization of pinned layer 48 is fixed in a predetermined direction, typically normal to the air bearing surface of GMR spin valve 34, while a magnetization of free layer 44 rotates freely in response to magnetic flux emanating from magnetic disc 32. The resistance of GMR spin valve 34 varies as a function of an angle formed between the magnetization direction of free layer 44 and the magnetization direction of pinned layer 48. Spacer layer 46 is preferably formed of a nonmagnetic material, whereas free layer 44 and pinned layer 48 are each preferably formed of ferromagnetic materials. GMR spin valve 34 may include additional layers, for instance an antiferromagnetic layer, a permanent magnet layer, or a soft adjacent layer.

Resistance changes of GMR spin valve 34 can be detected by providing a constant sense current through GMR spin valve 34 and monitoring the voltage across GMR spin valve 34, resistance changes of GMR spin valve 34 can be detected. First and second current contacts 40 and 42, though connection to a source of voltage (not shown in FIG. 3), provide this sense current through GMR spin valve 34. First and second current contacts 40 and 42 are each preferably formed of a metallic material, such as gold or tantalum.

GMR spin valve 34 is sandwiched between first and second shields 36 and 38 to ensure that GMR spin valve 34 reads only that information which is stored directly beneath it on magnetic disc 32. To enable first and second shields 36 and 38 to absorb stray magnetic fields, first and second shields 36 and 38 are each preferably formed of a material having a relatively high permeability, such a sendust.

As shown in FIGS. 3A and 3B, demagnetization field balance element 50 is positioned between first and second shields 36 and 38, and between first and second current contacts 40 and 42. Demagnetization field balance element 50 is not shown in FIG. 3C, which shows the air bearing surface of magnetic read head 30, since it is located on the side opposite disc 32 of GMR spin valve 34. Demagnetization field balance element 50 serves to increase the effective stripe height of GMR spin valve 34 from stripe height h1 (the length of GMR spin valve 34 along its side perpendicular to magnetic disc 32) to effective stripe height h2 (the length of both GMR spin valve 34 and demagnetization field balance element 50 along their sides perpendicular to magnetic disc 32). To accomplish this goal, it is necessary that demagnetization field balance element 50 be magnetically coupled to GMR spin valve 34. Furthermore, it is necessary that demagnetization field balance element 50 be electrically isolated from GMR spin valve 34, first current contact 40, and second current contact 42.

By magnetically coupling demagnetization field balance element 50 to GMR spin valve 34, the effective anisotropy field Hk* of GMR spin valve 34 is reduced since, magnetically, the effective stripe height of GMR spin valve 34 is increased to stripe height h2. As explained with reference to FIG. 2, the effective anisotropy field Hk* of a spin valve is inversely related to the stripe height of the GMR spin valve. More specifically, as described above, the effective anisotropy field Hk* of GMR spin valve 34 is roughly proportional to the magnetic moment Mrt of free layer 44 divided by the effective stripe height h2 of GMR spin valve. Accordingly, read sensitivity, which is inversely proportional to the effective anisotropy field Hk*, can be increased one hundred percent by simply making the stripe height of demagnetization field balance element 50 equal to the stripe height of GMR spin valve 34.

By electrically isolating demagnetization field balance element 50 from GMR spin valve 34, first current contact 40, and second current contact 42, sense current traveling from first current contact 40 to second current contact 42 will not pass through demagnetization field balance element 50. As such, the efficiency of GMR spin valve 34 is not reduced by the addition of demagnetization field balance element 50 since, electrically, the stripe height of GMR spin valve 34 is not increased.

To electrically isolate demagnetization field balance element 50 from GMR spin valve 34, first current contact 40, and second current contact 42, demagnetization field balance element 50 must be physically separated from those elements. In a first alternate embodiment of the present invention, demagnetization field balance element 50 is formed of a material similar to the material which forms free layer 44, that is a ferromagnetic material. In this embodiment, demagnetization field balance element 50 is physically separated from GMR spin valve 34, first current contact 40 and second current contact 42 by separation trench 52. Separation trench 52 can be fabricated through the use of a focus ion beam trim process. In a preferred embodiment, separation trench 52 may be left as a layer of air, or separation trench 52 may be a layer of an insulating material, such as an aluminum-silicon-nitride alloy, alumina, or silica. In a preferred embodiment, a thickness of separation trench 52 is preferably less than about 100 Angstroms.

Figure 4:
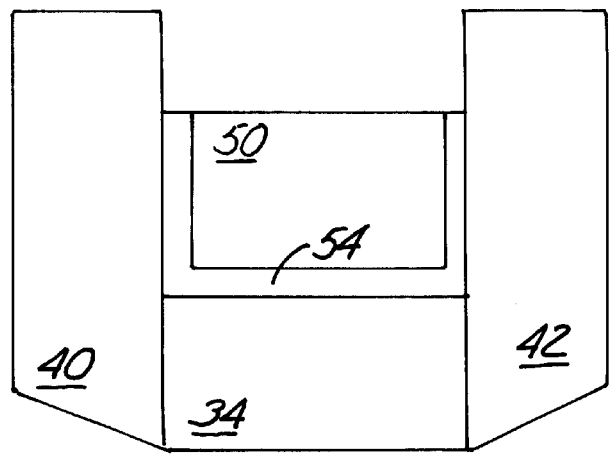
FIG. 4 is a cross-sectional view of a magnetic read of the present invention.

FIG. 4 illustrates a second alternate embodiment of the present invention. FIG. 4 is a cross-sectional view of magnetic read 56 of the present invention and is similar to the cross-sectional view shown in FIG. 3B. All elements common to both FIG. 3B and FIG. 4 are similarly numbered. As in FIG. 3B, all spacing and insulating layers are omitted for clarity, and for ease explanation, magnetic read head 56 and its components are not drawn to scale.

In the second alternate embodiment of the present invention, demagnetization field balance element 50 is formed by first photolithographically patterning a first photo mask over GMR spin valve 34 to define GMR spin valve 34, oxidizing the exposed edges of GMR spin valve 34 to form insulation layer 54, depositing a layer of a soft magnetic material, and lifting away the first photo mask to form demagnetization field balance element 50 from the soft magnetic material. In a preferred embodiment, demagnetization field balance element 50 is preferably formed of a ferromagnetic material similar to the ferromagnetic material used to form free layer 44. In a preferred embodiment, a thickness of insulation layer 54 is preferably less than about 100 Angstroms.

Those skilled in the art of magnetic read head design will note that the present invention applies to magnetic read heads having amorphous magnetoresistive read sensors in place of a GMR spin valve read sensor. In addition, additional configurations of the GMR spin valve are possible.

In conclusion, the present invention adds a demagnetization field balance element to a magnetic read element to increase an "magnetic" stripe height without increasing the "electrical" stripe height. Accordingly, the magnetic read head of the present invention has a read sensitivity substantially greater than a magnetic read head of the prior art.

Although the present invention has been described with reference to preferred embodiments, workers skilled in the art will recognize that changes may be made in form and detail without departing from the spirit and scope of the invention.

What is claimed is:

1. A magnetic read head for use in a magnetic data storage and retrieval system, the magnetic read head comprising:
    a giant magnetoresistive spin valve; and
    means for both increasing the read sensitivity of the giant magnetoresistive spin valve and decreasing the demagnetization field acting upon the giant magnetoresistive spin valve.

2. A magnetic read head for use in a magnetic data storage and retrieval system, the magnetic read head comprising:
    a first and a second current contact;
    a magnetoresistive read sensor positioned between the first and the second current contacts, the magnetoresistive read sensor having an air bearing surface; and
    a demagnetization field balance element positioned co-planar with the magnetoresistive read sensor on a side of the magnetoresistive read sensor opposite the air bearing surface, the demagnetization field balance element being both electrically isolated from and magnetically coupled to the magnetoresistive read sensor, wherein the demagnetization field balance element is separated from the magnetoresistive read sensor by an insulator.

3. The magnetic read head of claim 2 wherein the demagnetization field balance element is electrically isolated from both the first and the second current contacts.

4. The magnetic read head of claim 3 wherein the demagnetization field balance element is formed of a ferromagnetic material.

5. The magnetic read head of claim 3 wherein the demagnetization field balance element is also physically separated from the first current contact and the second current contact by the insulator.

6. The magnetic read head of claim 5 wherein a separation trench in which the insulator is positioned is fabricated through use of a focus ion beam trim process between the demagnetization field balance element and each of the magnetoresistive read sensor and the first and second contacts, wherein the separation trench extends an entire thickness of the demagnetization field balance element.

7. The magnetic read head of claim 5 wherein the insulator is air.

8. The magnetic read head of claim 5 wherein the insulator is an insulating material such as an aluminum-silicon-nitride alloy.

9. The magnetic read head of claim 6 wherein a thickness of the separation trench is less than about 100 Angstroms.

10. The magnetic read head of claim 3 wherein the demagnetization field balance element is formed by photolithographically patterning a first photo mask over the magnetoresistive read sensor to define the magnetoresistive read sensor, oxidizing exposed edges of the magnetoresistive read sensor to form an insulation layer, depositing a layer of a soft magnetic material over the insulation layer, and lifting away the first photo mask to form the demagnetization field balance element.

11. The magnetic read head of claim 10 wherein a thickness of the insulation layer is less than about 100 Angstroms.

12. A magnetic read head for use in a magnetic data storage and retrieval system, the magnetic read head comprising:
    a first and a second current contact;
    a giant magnetoresistive spin valve having a free layer, a pinned layer, and a spacer layer positioned between the free layer and the pinned layer, the free layer, the pinned layer, and the spacer layer each being positioned between the first and the second current contacts, the giant magnetoresistive spin valve having an air bearing surface; and
    a demagnetization field balance element co-planarly positioned with the giant magnetoresistive spin valve on a side of the giant magnetoresistive spin valve opposite the air bearing surface, wherein the demagnetization field balance element is both electrically isolated from and magnetically coupled to the giant magnetoresistive spin valve by an insulator positioned between the demagnetization field balance element and the giant magnetoresistive spin valve.

13. The magnetic read head of claim 12 wherein the demagnetization field balance element is electrically isolated from both the first and the second current contacts.

14. The magnetic read head of claim 13 wherein the demagnetization field balance element is formed of a ferromagnetic material that is physically separated from the first current contact and the second current contact by the insulator.

15. The magnetic read head of claim 14 wherein a separation trench in which the insulator is positioned is fabricated through use of a focus ion beam trim process between the demagnetization field balance element and each of the giant magnetoresistive spin valve and the first and second contacts, wherein the separation trench extends an entire thickness of the demagnetization field balance element.

16. The magnetic read head of claim 14 wherein the insulator is air.

17. The magnetic read head of claim 14 wherein the insulator is an aluminum-silicon-nitride alloy.

18. The magnetic read head of claim 15 wherein a thickness of the separation trench is less than about 100 Angstroms.

19. The magnetic read head of claim 13 wherein the demagnetization field balance element is formed by photographically patterning a first photo mask over the magnetoresistive read sensor to define the magnetoresistive read sensor, oxidizing exposed edges of the magnetoresistive read sensor to form an insulation layer, depositing a layer of a soft magnetic material over the insulation layer, and lifting away the first photo mask to form the demagnetization field balance element.

20. The magnetic read head of claim 19 wherein a thickness of the insulation layer is less than about 100 Angstroms.

* * * * *